United States Patent

Merkli et al.

[11] Patent Number: 5,149,083
[45] Date of Patent: Sep. 22, 1992

[54] CONVEYOR ASSEMBLY WITH GRIPERS FOR SHEET-LIKE PRODUCTS

[75] Inventors: Peter Merkli, Oftringen; Jean-Claude Oppliger, Niederhasli Schweiz, both of Switzerland

[73] Assignee: GRAPHA-Holding AG, Hergiswil, Switzerland

[21] Appl. No.: 679,800

[22] Filed: Apr. 3, 1991

[30] Foreign Application Priority Data

Apr. 11, 1990 [CH] Switzerland ............... 1250/90

[51] Int. Cl.[5] .......................................... B65H 29/04
[52] U.S. Cl. ..................... 271/277; 271/204; 271/82
[58] Field of Search .......... 271/268, 277, 275, 204, 271/205, 206, 82, 85; 198/803.9, 803.7, 803.8, 845, 838

[56] References Cited

U.S. PATENT DOCUMENTS

| | | | |
|---|---|---|---|
| 3,179,404 | 4/1965 | Felts et al. ............ | 271/277 X |
| 4,638,906 | 1/1987 | Winiasz ............... | 198/803.9 |
| 4,746,007 | 5/1988 | Houseman ............. | 198/470.1 |
| 4,836,357 | 6/1989 | Focke . | |

FOREIGN PATENT DOCUMENTS

| | | |
|---|---|---|
| 0095602 | 5/1983 | European Pat. Off. . |
| 1206228 | 6/1966 | Fed. Rep. of Germany . |
| 2629528 | 2/1977 | Fed. Rep. of Germany . |
| 2518776 | 6/1979 | Fed. Rep. of Germany . |
| 592562 | 5/1974 | Switzerland . |
| 051487304 | 6/1978 | United Kingdom . |

Primary Examiner—David H. Bollinger
Attorney, Agent, or Firm—Peter K. Kontler

[57] ABSTRACT

A conveyor assembly with uniformly spaced-apart grippers for sheet-like printed products wherein the grippers are pulled along a plastic guide by one or more endless flexible bands which replace conventional chains. Each gripper has one, two or more roller followers which are movable along one, two or more tracks defined by the guide. The guide has one or more plastic rails which are affixed to a strip-shaped metallic carrier. The grippers have pairs of jaws one of which supports the follower or followers and the other of which is pivotably mounted on the one jaw and is permanently biased to an operative positioned or to an inoperative position by a prestressed leaf spring which is integral with the second jaw.

24 Claims, 1 Drawing Sheet

CONVEYOR ASSEMBLY WITH GRIPERS FOR SHEET-LIKE PRODUCTS

BACKGROUND OF THE INVENTION

The invention relates to conveyor assemblies with grippers for discrete products or groups of discrete products. More particularly, the invention relates to improvements in gripper conveyor assemblies which can be utilized with advantage for the transport of sheet-like products (such as sections of newspapers) between a pickup station and a delivery station.

Presently known gripper conveyor assemblies for sheet-like products normally employ chains which serve to transport a set of spaced-apart grippers along a preselected path. The links of the chain in a conventional conveyor are connected to each other by universal joints. Reference may be had, for example, to German Pat. No. 1,206,228, to published German patent application No. 26 29 528, to U.S. Pat. No. 4,638,906 and to U.S. Pat. No. 4,746,007. Each gripper has rollers designed to move along tracks which are defined by a metallic guide. Each chain is an endless chain which is driven by at least one sprocket wheel.

Grippers which are used in the above outlined chain conveyor assemblies have pairs of jaws which can engage discrete products during transport between the pickup and delivery stations. Certain other types of grippers are described and shown in Swiss Pat. No. 592 562 and in European Pat. No. 0 095 602. The grippers can engage successive products of a stream of products which are disposed end-to-end, or successive products which form a scalloped stream of partly overlapping products.

A drawback of heretofore known gripper conveyor assemblies is that the metallic guide for the roller followers of links of the chain conveyor must be machined and/or otherwise finished with a very high degree of precision which contributes significantly to the manufacturing cost. A high degree of precision in the making and/or mounting of a metallic guide is necessary because even minor deviations from optimum dimensions can cause the generation of pronounced noise which is attributable to rolling movement of the followers of the links along their track or tracks. Another drawback of conventional chain conveyor assemblies is that the cost of a chain which consists of numerous discrete links with universal joints between them is very high. Moreover, each link is provided with at least one roller follower which also contributes to the cost of the chain. The bulk and weight of a chain are considerable, especially in comparison with the weight of conveyed products. The weight of the chain conveyor plays a considerable role when the conveyor assembly is installed in a newspaper printing plant or in another establishment for the making, assembling and other processing of printed products wherein the products must be transported between several storeys and along elongated paths which can cover a distance of several hundred yards or even longer. The links of the chains, the joints and the followers are subjected to extensive wear so that they generate high maintenance, repair and replacement costs.

Another drawback of conventional gripper conveyor assemblies is that the grippers are heavy, bulky and expensive.

OBJECTS OF THE INVENTION

An object of the invention is to provide a simple, lightweight and inexpensive gripper conveyor assembly.

Another object of the invention is to provide a novel and improved device for moving the grippers of the conveyor assembly along a desired path.

A further object of the invention is to provide a gripper conveyor assembly which need not employ a chain conveyor.

An additional object of the invention is to provide a gripper conveyor assembly which generates less noise than heretofore known gripper conveyor assemblies.

Still another object of the invention is to provide a gripper conveyor assembly which can be readily shortened, lengthened and/or otherwise altered with little loss in time in order to change the path for the grippers in a number of desired ways.

A further object of the invention is to provide novel and improved grippers for use in the above outlined conveyor assembly.

Another object of the invention is to provide the grippers of the above outlined conveyor assembly with novel and improved sets of jaws for sheet-like products, such as sections of newspapers.

An additional object of the invention is to provide the above outlined conveyor assembly with a novel and improved combination of grippers and moving means therefor.

A further object of the invention is to provide a novel and improved guide for roller followers which can be used in the above outlined gripper conveyor assembly.

Another object of the invention is to provide a novel and improved method of assembling the constituents of the above outlined conveyor assembly.

An additional object of the invention is to provide a novel and improved combination of guide means and carrier means for use in the above outlined conveyor assembly.

SUMMARY OF THE INVENTION

One feature of the present invention resides in the provision of a gripper conveyor assembly which can be utilized with particular advantage for the transport of sheet-like printed products. The conveyor assembly comprises an elongated guide which consists of a suitable plastic material and defines at least one elongated track, a plurality of grippers having followers which are movable along the at least one track, and means for moving the grippers relative to the guide. The moving means comprises at least one flexible traction element which is connected with the grippers.

The followers can constitute or include rollers or wheels (hereinafter called rollers), and the guide preferably defines a plurality of tracks. Each gripper then comprises a plurality of rollers, at least one for each track of the guide.

The conveyor assembly preferably further comprises a substantially rigid elongated carrier for the guide. The carrier defines an elongated (particularly an endless) path for the grippers, and the guide comprises at least one elongated rail which is connected with the carrier. The carrier can comprise a plurality of elongated metallic sections which are disposed end-to-end. In accordance with a presently preferred embodiment, the carrier comprises two spaced-apart longitudinally extending marginal portions, and the guide can comprise two elongated rails each of which is connected to a different marginal portion of the carrier. The at least one rail or each of the two rails can be form-lockingly or force-lockingly connected with the carrier.

The carrier can have a substantially rectangular cross-sectional outline. The single rail or each of the two rails can have a substantially U-shaped cross sectional outline and includes an elongated web and two elongated legs defining a track. The web has a longitudinally extending recess for the marginal portion of the carrier. The two rails can be substantially identical and can be substantial mirror images of each other when mounted on the marginal portions of the carrier. The legs of each rail define a discrete track, and the webs of the two rails can define a third track so that each gripper can include at least three discrete followers. Thus, one of the tracks can be defined by one of the rails in cooperation with the other rail.

The carrier can be a laminated structure with several superimposed layers or strata.

Those followers of a gripper which are movable along tracks defined by the legs of the two rails can be mounted for rotation about parallel axes, and the follower or followers which are movable along the track between the webs of the two rails are preferably mounted for rotation about second axes which are normal to the first axes.

The grippers preferably comprise frames, and the followers are rotatably mounted on or in the respective frames. Means (e.g., rivets) are provided for connecting the at least one traction element to the frames of the grippers.

Another feature of the invention resides in the provision of a device for moving a plurality of grippers in a conveyor assembly wherein an elongated guide defines at least one elongated track for followers which form part of grippers. The moving device comprises at least one elongated flexible traction element which is designed to withstand tensional stresses and includes an elongated strand. The strand can be an endless strand, and the moving device further comprises means (e.g., rivets) for connecting the strand with the grippers of the conveyor assembly. The strand can constitute a flat band or belt of textile and/or other material.

A further feature of the invention resides in the provision of a gripper conveyor assembly which comprises (a) at least one elongated guide defining at least one elongated track, (b) a plurality of grippers each of which includes at least one follower which is movable along the at least one track, a frame supporting the at least one follower and including a first jaw, and a second jaw which is movable relative to the first jaw, and (c) means for moving the grippers along the guide. The moving means comprises at least one elongated flexible traction element which is designed to withstand tensional stresses and includes an elongated strand, and the assembly further comprises means for connecting the strand to the frames of the grippers. The second jaw of each gripper is movable relative to the respective first jaw between a first position in which the jaws cooperate to grip at least one substantially sheet-like product between them and a second position in which the product or products are released.

Still another feature of the invention resides in the provision of a gripper for moving products in a conveyor assembly wherein a guide defines at least one elongated track, particularly for moving substantially sheet-like printed products. The gripper comprises a first jaw, at least one follower which is carried by the first jaw and is movable along the at least one track, a second jaw which is movable relative to the first jaw between a first position in which the jaws cooperate to grip at least one product, a second position in which the second jaw is remote from the first jaw and a product can be introduced between or withdrawn from between the jaws, and a dead-center third or intermediate position between the first and second positions, and means for biasing the second jaw to the first and second positions with at least one first force and in the dead-center position with a second force greater than the at least one first force.

The gripper further comprises means for pivotally mounting the second jaw on the first jaw. The biasing means preferably comprises a cam which is provided on the first jaw and a resilient element which tracks the cam and is connected with the second jaw. The resilient element preferably includes a prestressed leaf spring which is or can be integral with the second jaw. The leaf spring can comprise two crossing portions or legs and a bight which is disposed between the crossing portions and forms part of the second jaw. One portion of the leaf spring is preferably forked and includes two prongs which flank or straddle the other portion. The one portion is connected with the mounting means and the other portion tracks the cam.

The first jaw can include a frame, and the at least one follower can be rotatably installed in the frame.

The first jaw has a first gripping surface and the second jaw has a second gripping surface which confronts the first gripping surface in the first position but faces away from the first gripping surface in the second position of the second jaw.

The novel features which are considered as characteristic of the invention are set forth in particular in the appended claims. The improved gripper conveyor assembly itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
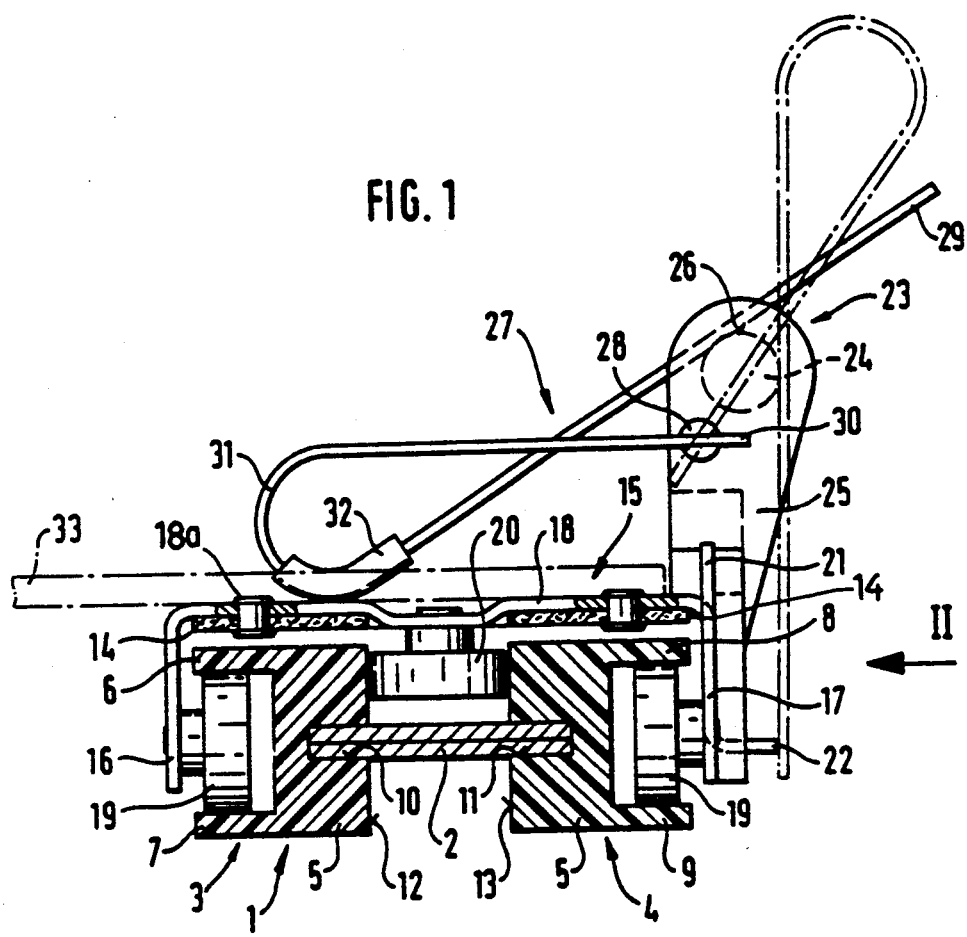
FIG. 1 is a fragmentary transverse sectional view of a gripper conveyor assembly which embodies one form of the invention, the second position of the movable second jaw of a gripper being indicated by phantom lines and a portion of a sheet-like product being also indicated by phantom lines.
Figure 2:
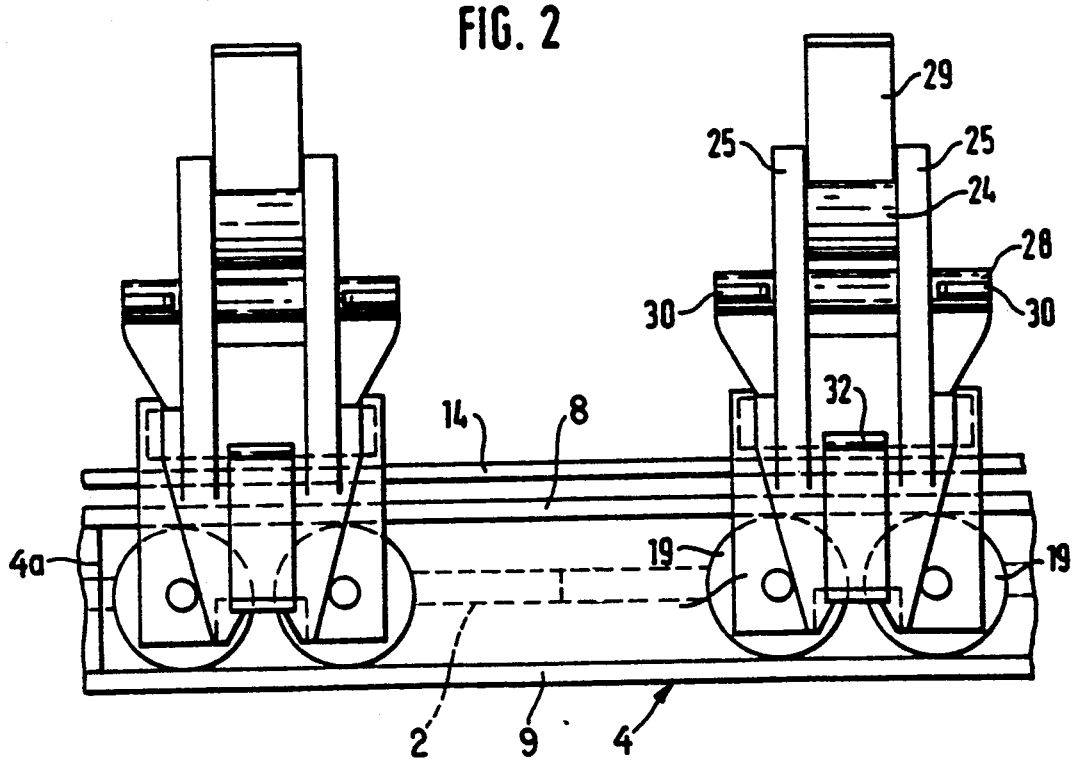
FIG. 2 is a fragmentary side elevational view of the gripper conveyor assembly, substantially as seen in the direction of arrow II in FIG. 1, and shows two neighboring grippers with the mobile second jaws of both grippers shown in the first or operative positions.

The gripper conveyor assembly which is shown in FIGS. 1 and 2 is designed to pick up discrete sheet-like products 33 or sets or groups of discrete sheet like products (one indicated in FIG. 1 by phantom lines) at a first station and to deliver such products to a second conveyor assembly or to another receiver at a second station. The products 33 are assumed to be supplied in the form of a scalloped stream, e.g., as shown in FIG. 6a of U.S. Pat. No. 4,746,007 to which reference may be had, if necessary. Each product 33 can constitute a signature of a newspaper section.

The conveyor assembly comprises an elongated guide 1 which, in accordance with a feature of the invention, is made of a suitable plastic material, an elongated metallic carrier 2 for the guide 1, a plurality of preferably equidistant grippers 15 for the products 33, and a novel two-piece towing or traction element including two neighboring flat-band-like strands 14 (hereinafter called bands or belts for short).

The carrier 2 can be made of iron or another suitable metallic material which can be shaped to impart to the guide 1 a designed configuration, preferably a configuration such that the grippers 15 can be moved along an endless path between (if necessary) several different levels and through substantial distances, e.g., in a printing or newspaper assembling plant.

FIG. 1 shows that the carrier 2 can comprise several layers or strata to enhance its stability. The brackets or other suitable means for mounting the carrier in the plant are not shown in the drawing. FIG. 2 shows that the carrier 2 can be assembled of several elongated sections which are disposed end-to-end.

The guide 1 comprises two identical elongated rails 3 and 4 which are made of a rather readily deformable plastic material and are substantial mirror images of each other. Each of the two rails 3, 4 can be assembled of several elongated sections which are disposed end-to-end, the same as the carrier 2. This can be seen (at 4a) for the rail 4 in FIG. 2.

Each rail has a U-shaped cross-sectional outline and includes a relatively thick web 5 and two substantially parallel legs 6, 7 (rail 3) and 8, 9 (rail 4). Those sides or surfaces (12, 13) of the webs 5 which face each other define a first elongated track for roller-shaped followers 20 of the grippers 15, and the central portions of the surfaces are provided with longitudinally extending recesses or grooves 10 (surface 12) and 11 (surface 13) for the respective longitudinally extending marginal portions of the carrier 2. The deformability and elasticity of the webs 5 is sufficient to ensure that the rails 3, 4 are reliably connected with the carrier 2 as soon as the marginal portions of the carrier are properly introduced into the respective recesses 10 and 11. At such time, the width of the track between the surfaces 12, 13 is satisfactory to properly guide the roller followers 20 of the grippers 15. The illustrated force-locking connections between the webs 5 and the respective marginal portions of the carrier 2 can be replaced with suitable form-locking connections without departing from the spirit of the invention. For example, the marginal portions of the carrier 2 can include or constitute beads and the recesses 10, 11 can be configurated to receive and to be filled by the respective beads. Other types of tongue-and-groove connections between the carrier 2 (or an analogous carrier) and the webs 5 of the rails 3, 4 can be used with equal or similar advantage.

The surfaces 12, 13 can serve solely as a track to enable the followers 20 of the grippers 15 to roll therealong. However, where necessary, the surfaces 12, 13 can further serve to guide (i.e., to change the orientation of) the grippers 15 on their way from a pickup station to a delivery station, back to the pickup station and so forth. The carrier 2 can cooperate with the rails 3, 4 to define for the grippers 15 (and hence for the products 33) a relatively simple path or a rather complex path wherein the orientation of the grippers changes again and again, depending on the nature of the space which is available for installation of the improved conveyor assembly. The term "guide" (denoting the part 1 including the rails 3, 4 or at least one of these rails) is intended to denote a device which can perform all of the above outlined functions to ensure that the grippers 15 are reliably advanced along a selected path extending past at least one pickup station and at least one delivery station.

The legs 6, 7 of the rail 3 define a second track for pairs of roller followers 19 forming part of the grippers 15, and the legs 8, 9 of the rail 4 define a third track for additional pairs of roller followers 19 forming part of the grippers 15. Thus, each of the illustrated grippers 15 comprises at least five roller followers, namely two roller followers 19 in the track which is defined by the legs 6, 7 of the rail 3, two roller followers 19 in the track which is defined by the legs 8, 9 of the rail 4, and at least one roller follower 20 in the track which is defined by the surfaces 12, 13 of the two webs 5. The legs 6, 7 and 8, 9 can also perform several functions, such as merely inducing the roller followers 19 to roll therealong and/or causing these roller followers to change the orientation of the grippers 15 during movement along certain portions of their endless path.

The guide 1 and the carrier 2 can be assembled in a simple and time-saving manner as follows: Successive sections of the carrier 2 are mounted along the prescribed path and are connected to each other and/or to supporting brackets in any suitable way. Conventional means can be employed to impart to the carrier 2 a desired shape including an arcuate shape, twisted portions and/or others so that parts of the assembled carrier 2 will extend partly in a vertical plane, partly in a horizontal plane and partly in one or more planes which are inclined to the horizontal and/or vertical. The carrier 2 can be twisted about its longitudinal axis to form one or more spirals or similar shapes. Once the installation of the carrier 2 is completed (i.e., once the establishment of the path for the grippers 15 is completed), sections of the rails 3 and 4 are simply slipped onto the respective marginal portions of the installed carrier 2 and the roller followers 19, 20 of the grippers 15 are introduced into their respective tracks. The ends of sections of the rails 3 and 4 are preferably staggered relative to the ends of sections of the carrier 2 so that the sections of the rails can serve as additional or sole connectors between successive sections of the carrier.

If desired, the illustrated simple carrier 2 (which has an elongated rectangular cross-sectional outline) can be replaced with a more complex carrier, e.g., a carrier having a U-shaped, cruciform or other cross-sectional outline. As mentioned above, it is also possible to reinforce the marginal portions of the illustrated carrier 2 so that the marginal portions resemble rounded or otherwise configurated beads which can be form-lockingly connected with the respective plastic rails of the guide 1. Tongue-and-groove connections between the carrier and the rails have been found to be highly satisfactory. The cross-sectional outlines of the rails are selected with a view to ensure the establishment of reliable connections with the respective marginal portions of the carrier 2 as well as to form tracks of desired width and cross-sectional outline for optimum guidance of roller followers 19 and 20.

The strands or belts 14 of the moving means for the grippers 15 are substantially coplanar and each such strand or belt is connected to a frame 18 of each gripper by one or more rivets 18a or other suitable fasteners.

The illustrated flat belt-like strands 14 can be replaced with cables, ropes, cords or like tension-resistant elongated flexible elements without departing from the spirit of the invention. The illustrated strands or belts 14, can be made of rubber or a plastic material and can be reinforced with textile filaments or the like. Many commercially available conveyor belts can be used to pull the grippers 15 along the path which is defined by the carrier 2 in conjunction with the rails 3 and 4 of the guide 1. It is important to select one or more belts 14 which can stand tensional stresses so that they do not tear or break in actual use as well as that they cannot be unduly stretched to thus change the mutual spacing of the grippers 15. It is further desirable to select belts 14 which can be twisted through at least $+/-90°$ without suffering damage even if such twisting takes place at frequent intervals.

The frame 18 of each gripper 15 carries two relatively wide legs 16, 17. Each leg 16 rotatably mounts two roller followers 19 so that they can extend into the track which is defined by the legs 6, 7 of the rail 3, and each leg 17 rotatably mounts two additional roller followers 19 which extend into the track between the legs 8, 9 of the rail 4. The axes of all four roller followers 19 on a gripper 15 are parallel to each other and are normal to the axis or axes of one or more roller followers 20 which are mounted directly on the main or central portion of the frame 18 and extend into the track between the surfaces 12, 13 of the two webs 5. The main or central portion and the legs 16, 17 of each frame 18 constitute a body having a substantially U-shaped outline and the legs 16, 17 are outwardly adjacent the rail 3 and rail 4, respectively. The legs 16, 17 are wider than the main or central portion of each frame 18. The roller followers 19 and 20 are idler rollers which are free to roll along the respective tracks when the belts 14 are pulled to advance the grippers 15 along their path. The roller followers 19, 20 can serve to guide the respective grippers 15 along the endless path and/or to facilitate the advancement of grippers 15 in response to exertion of a pull upon the belts 14.

The leg 17 of each frame 18 has an extension 21 which projects beyond the main or central portion of the frame, and with a bent-over portion or lug 22 which can serve as a stop. The lug 22 is located at the free end of the respective leg 17 and midway between the narrow edge faces of such leg.

Each leg 17 further supports a bearing member 23 which includes two flanges 25 and a cylindrical pin 24 between the flanges. The pin 24 has a cylindrical peripheral surface 26. This peripheral surface serves as a cam face for a specially designed prestressed leaf spring 27 which is integral with a mobile jaw 31, 32 of the respective gripper 15. The main portion of the frame 18 constitutes the stationary or fixed first jaw of the respective gripper 15. The flanges 25 of each bearing member 23 rotatably support a rockable shaft 28 which is bifurcated at both ends at the outer sides of the respective flanges 25 to accept the prongs of the bifurcated end portion 30 of the respective leaf spring 27. The latter serves to bias the second jaw 31, 32 of the respective gripper 15 to a first position which is shown in FIG. 1 by solid lines or to a second position which is shown in FIG. 1 by phantom lines. Each second jaw 31, 32 is movable through an intermediate or dead-center position in which the bias of the leaf spring 27 is most pronounced. Thus, the second jaw 31, 32 is biased to its first or second position with a first force, and is biased in its intermediate or dead-center position with a greater second force.

The end portions 29 and 30 of each leaf spring 27 cross each other and are integrally connected to one another by a loop-shaped bight 31 which forms part of the respective second jaw 31, 32. The latter further includes an elastic sleeve 32 which surrounds a portion of the bight 31 and actually engages a product 33 when the second jaw 31, 32 is maintained in the first position which is shown in FIG. 1 by solid lines. The first jaw is an integral part of the frame 18, namely of the central or main portion of the frame between the legs 16 and 17. The end portion 29 of each leaf spring 27 is disposed between the respective flanges 25 and tracks the peripheral surface of cam face 26 of the cylindrical pin 24. The shaft 28 turns about its axis relative to the respective bearing member 23 when the second jaw 31, 32 is caused to move between its first and second positions. When the second jaw 31, 32 reaches the intermediate or dead-center position, the distance of the axis of the shaft 28 from the locus of contact of the end portion 29 of the leaf spring 27 with the peripheral surface 26 of the pin 24 is increased to a maximum value.

The bias of the leaf spring 27 suffices to ensure reliable engagement and retention of at least one sheet-like product 33 between the first jaw (central or main portion of the frame 18) and the second jaw 31, 32 when the second jaw assumes the first or operative position which is shown in FIG. 1 by solid lines. At such time, the product-engaging surfaces of the two jaws confront each other and engage the opposite sides of a product 33 between them. When the second jaw 31, 32 assumes the phantom-line second position of FIG. 1, the product-engaging surface of the second jaw 31, 32 faces away from the product-engaging surface of the first jaw. The second jaw 31, 32 is maintained in the second position during movement of the respective gripper 15 from the delivery station back toward the pickup station. When a gripper approaches the pickup station, the product-engaging surface of the first jaw and the oncoming product 33 move substantially tangentially of each other. When a product 33 reaches and contacts the product-engaging surface of a first jaw (namely the central or main portion of the respective frame 18), the bight 31 of the leaf spring 27 reaches and engages a stationary cam (not shown) which causes the second jaw 31, 32 to move from the second position toward the dead-center intermediate position whereupon the leaf spring 27 propels the second jaw to the solid-line first position of FIG. 1. The cooperating jaws of a gripper 15 can engage a single sheet-like product or two or more partially or fully overlapping products.

The gripper 15 which has engaged and entrained one or more products 33 at the pickup station advances toward the delivery station and the leaf spring 27 is engaged by a stationary cam (not shown) to move the second jaw 31, 32 from the first end position toward the dead-center position whereupon the spring 27 propels the second jaw to the second end position so that the entrained product or products are released and can descend by gravity or can be taken over by another conveyor, not shown. When the second jaw 31, 32 of FIG. 1 reaches the second end position, the free end of the end portion 29 of the leaf spring 27 abuts the stop 22.

The feature that the first jaw of each gripper 15 is constituted by or forms part of the respective frame 18 and that the leaf spring 27 is located at one side of the frame 18 in the second end position of the mobile second jaw 31, 32 is desirable and advantageous because this renders it possible to select, practically at will, the arrangement of parts at the pickup and delivery stations. Thus, there is ample room to properly position the conveyor or conveyors which supply products 33 to the pickup station and/or the conveyor or conveyors which receive products 33 at the delivery station.

An important advantage of the improved conveyor assembly is that it generates much less noise than a conventional conveyor assembly wherein the followers of the grippers are compelled to advance along one or more tracks which are defined by a metallic guide. Furthermore, the weight of the improved conveyor assembly is a fraction of the weight of a conventional conveyor assembly wherein the traction element is an endless chain. In addition, the cost of the means for moving the grippers 15 along their normally endless path is but a fraction of the cost of a conventional chain with a large number of links, followers and universal joints between the links. The novel conveyor assembly can be put together or taken apart in a simple and timesaving manner without resorting to specially designed tools. The sections of the rails 3, 4 and of the carrier 2 can be reused in other conveyor assemblies.

The grippers 15 exhibit the advantage that they are simpler, more compact and less expensive than conventional grippers. Thus, the frame 18 of each gripper 15 can perform a number of functions including the establishment of a connection (by rivets 18a) with the belts 14, forming part of or constituting the first jaw, supporting the roller followers 19 and 20, carrying the second jaw 31, 32 and carrying the leaf spring 27, i.e., the means for biasing the second jaw.

The belts 14 are commercially available commodities which can be cut to a desired length and can be driven in any convenient manner to pull the grippers 15 from the pickup station to the delivery station, from the delivery station on to the pickup station, and so forth.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A gripper conveyor assembly, particularly for sheet-like products, comprising an elongated guide defining a plurality of elongated tracks; a plurality of grippers each having a plurality of roller followers, at least one for each of said tracks and each movable along the respective track; a substantially rigid elongated carrier defining a predetermined path for said grippers and said guide comprising at least one elongated plastic rail connected with said carrier; and means for moving said grippers relative to said guide, including at least one flexible traction element connected with said grippers.

2. The conveyor assembly of claim 1, wherein said grippers comprise frames and said followers are rotatably mounted on the respective frames, and further comprising means for connecting said at least one traction element to said frames.

3. A device for moving a plurality of grippers in a conveyor assembly wherein an elongated guide defines at least one elongated track for followers of the grippers, comprising at least one elongated traction element which is resistant to tensional stresses and includes an elongated endless belt; and means for connecting said belt with the grippers of the conveyor assembly.

4. In a gripper conveyor assembly, an elongated guide defining at least one elongated track; a plurality of grippers each including at least one follower movable along said at least one track, a frame supporting said at least one follower and including a first jaw, and a second jaw movable relative to said first jaw between a first position in which said jaws cooperate to grip at least one substantially sheet-like product between them and a second position in which the at least one product is released; means for moving said grippers along said guide, including at least one elongated flexible traction element which is resistant to tensional stresses and includes an elongated strand; and means for connecting said strand to the frames of said grippers.

5. A gripper for moving products in a conveyor assembly wherein a guide defines at least one elongated track, particularly for moving substantially sheet-like products, comprising a first jaw; at least one follower carried by said first jaw and movable along said at least one track; a second jaw movable relative to said first jaw between a first position in which said jaws cooperate to grip at least one product, a second position in which said second jaw is remote from said first jaw and at least one product can be introduced between or withdrawn from between said jaws, and a dead-center intermediate position between said first and second positions; and means for biasing said second jaw to said first and second positions with at least one first force and in said intermediate position with a second force greater than said at least one first force.

6. The gripper of claim 5, further comprising means for pivotally mounting said second jaw on said first jaw, said biasing means comprising a cam provided on said first jaw and a resilient element tracking said cam and connected with said second jaw.

7. The gripper of claim 6, wherein said resilient element includes a prestressed leaf spring.

8. The gripper of claim 7, wherein said leaf spring is integral with said second jaw.

9. The gripper of claim 8, wherein said leaf spring includes two crossing portions and a bight disposed between said crossing portions and forming part of said second jaw.

10. The gripper of claim 9, wherein one of said portions is forked and includes two prongs flanking the other of said portions.

11. The gripper of claim 10, wherein said one portion is connected with said mounting means and said other portion tracks said cam.

12. The gripper of claim 5, wherein said first jaw includes a frame and said at least one follower is rotatably installed in said frame.

13. The gripper of claim 5, wherein said first jaw has a first gripping surface and said second jaw has a second gripping surface which confronts said first surface in the first position and faces away from said first surface in the second position of said second jaw.

14. A gripper conveyor assembly, particularly for sheet-like products, comprising an elongated guide of plastic material, said guide defining at least one elongated track; a plurality of grippers having followers movable along said at least one track; a substantially rigid elongated carrier comprising a plurality of elongated metallic sections which are disposed end-to-end and define a predetermined path for said grippers, said guide comprising at least one elongated rail connected with said carrier; and means for moving said grippers relative to said guide, including at least one flexible traction element connected with said grippers.

15. A gripper conveyor assembly, particularly for sheet-like products, comprising an elongated guide of plastic material, said guide defining at least one elongated track; a plurality of grippers having followers movable along said at least one track; a substantially rigid elongated carrier for said guide, said carrier defining a predetermined path for said grippers and having two spaced-apart longitudinally extending marginal portions, said guide comprising two elongated rails each connected with a different one of said marginal portions; and means for moving said grippers relative to said guide, including at least one flexible traction element connected with said grippers.

16. A gripper conveyor assembly, particularly for sheet-like products, comprising an elongated guide of plastic material, said guide defining at least one elongated track; a plurality of grippers having followers movable along said at least one track; a substantially rigid elongated carrier for said guide, said carrier defining a predetermined path for said grippers and said guide comprising at least one elongated rail form-lockingly connected with said carrier; and means for moving said grippers relative to said guide, including at least one flexible traction element connected with said grippers.

17. A gripper conveyor assembly, particularly for sheet-like products, comprising an elongated guide of plastic material, said guide defining at least one elongated track; a plurality of grippers having followers movable along said at least one track; a substantially rigid elongated carrier for said guide, said carrier defining a predetermined path for said grippers and said guide comprising at least one elongated rail force-lockingly connected with said carrier; and means for moving said grippers relative to said guide, including at least one flexible traction element connected with said grippers.

18. A gripper conveyor assembly, particularly for sheet-like products, comprising an elongated guide of plastic material, said guide defining at least one elongated track; a plurality of grippers having followers movable along said at least one track; a substantially rigid elongated carrier for said guide, said carrier defining a predetermined path for said grippers and said guide comprising at least one elongated rail connected with said carrier, said carrier having a substantially rectangular cross-sectional outline and including two longitudinally extending marginal portions, said at least one rail having a substantially U-shaped cross-sectional outline and including an elongated web and two elongated legs defining said at least one track, said web having a longitudinally extending recess for one of said marginal portions; and means for moving said grippers relative to said guide, including at least one flexible traction element connected with said grippers.

19. The conveyor assembly of claim 18 wherein said guide comprises a second rail substantially identical with said at least one rail, the recess of the web of said second rail receiving the other marginal portion of said carrier and the legs of said second rail defining a second track, the webs of said rails defining at least one additional track.

20. A gripper conveyor assembly, particularly for sheet-like products, comprising an elongated guide of plastic material, said guide defining at least one elongated track; a plurality of grippers having followers movable along said at least one track; a substantially rigid elongated carrier for said guide, said carrier comprising a plurality of superimposed layers and defining a predetermined path for said grippers, said guide comprising at least one elongated rail connected with said carrier; and means for moving said grippers relative to said guide, including at least one flexible traction element connected with said grippers.

21. A gripper conveyor assembly, particularly for sheet-like products, comprising an elongated guide of plastic material, said guide defining at least one elongated track; a plurality of grippers having followers movable along said at least one track; a substantially rigid elongated carrier for said guide, said carrier defining a predetermined path for said grippers and said guide comprising two elongated rails connected with said carrier, said at least one track being defined jointly by said rails; and means for moving said grippers relative to said guide, including at least one flexible traction element connected with said grippers.

22. The conveyor assembly of claim 21, wherein each of said rails has a substantially U-shaped cross-sectional outline and each of said rails includes an elongated web, said at least one track being defined by said webs.

23. The conveyor assembly of claim 22, wherein each of said rails further comprises two elongated legs, the legs of said at least one rail defining a second track and the legs of said second rail defining a third track, each of said grippers having at least one first rotary follower movable along said at least one track, at least one second rotary follower movable along said second track and at least one third rotary follower movable along said third track.

24. The conveyor assembly of claim 1, wherein said first followers are rotatable about first axes and said second and third followers are rotatable about second axes which are at least substantially normal to the respective first axes.

* * * * *